(12) United States Patent
Chen et al.

(10) Patent No.: US 12,502,870 B2
(45) Date of Patent: Dec. 23, 2025

(54) ELECTROCHROMIC FILMS WITH EDGE PROTECTION

(71) Applicant: LannRay Optoelectronics (Zhenjiang) Co. Ltd., Zhenjiang (CN)

(72) Inventors: Zhao Chen, Camarillo, CA (US); Jian Wang, Fremont, CA (US); Yan Zhou, Fremont, CA (US)

(73) Assignee: Lann Ray Optoelectronics (Zhenjiang) Co. Ltd., Zhenjiang (CN)

( * ) Notice: Subject to any disclaimer, the term of this patent is extended or adjusted under 35 U.S.C. 154(b) by 0 days.

(21) Appl. No.: 18/606,980

(22) Filed: Mar. 15, 2024

(65) Prior Publication Data

US 2024/0217214 A1 Jul. 4, 2024

Related U.S. Application Data

(63) Continuation of application No. 18/152,033, filed on Jan. 9, 2023, now Pat. No. 11,969,970, which is a
(Continued)

(51) Int. Cl.
*G02F 1/153* (2006.01)
*B32B 17/10* (2006.01)
*G02F 1/1506* (2019.01)

(52) U.S. Cl.
CPC ........ *B32B 17/10* (2013.01); *B32B 17/10036* (2013.01); *B32B 17/10211* (2013.01); *B32B 17/10302* (2013.01); *B32B 17/10513* (2013.01); *B32B 17/10761* (2013.01); *G02F 1/1508* (2013.01); *G02F 1/1533* (2013.01)

(58) Field of Classification Search
CPC ...... G02F 1/1533; G02F 1/1508; G02F 1/153; G02F 1/161; G02F 2201/50; G02F 2201/1536
See application file for complete search history.

(56) References Cited

U.S. PATENT DOCUMENTS

| 5,406,414 A | 4/1995 | O'farrell et al. |
| 5,818,625 A | 10/1998 | Forgette et al. |

(Continued)

FOREIGN PATENT DOCUMENTS

| CN | 104375350 A | 2/2015 |
| CN | 104698715 A | 6/2015 |

(Continued)

OTHER PUBLICATIONS

Communication pursuant to Article 94(3) EPC for European Application No. 23164353.7 mailed on May 22, 2024.
(Continued)

*Primary Examiner* — Jack Dinh
(74) *Attorney, Agent, or Firm* — Sheppard Mullin Richter & Hampton LLP

(57) ABSTRACT

The present application discloses a method for preparing an electrochromic device. The method includes placing an edge protection material on a first and second substrates, placing a first and second interlayers respectively within the edge protection material on the first and second substrates, wherein the edge protection material surrounds edges of the first and second interlayers, and interposing an electrochromic film between the first and second interlayers. The edge protection material prevents chemicals in the first and second interlayers from entering into the electrochromic film.

12 Claims, 9 Drawing Sheets

Related U.S. Application Data continuation of application No. 16/190,723, filed on Nov. 14, 2018, now Pat. No. 11,571,878.

(56) References Cited

U.S. PATENT DOCUMENTS

| | | |
|---|---|---|
| 2004/0067343 A1 | 4/2004 | Beteille et al. |
| 2012/0013969 A1 | 1/2012 | Wang et al. |
| 2013/0010347 A1 | 1/2013 | Tajima et al. |
| 2015/0301367 A1 | 10/2015 | Mennig |
| 2015/0323849 A1 | 11/2015 | Han |
| 2016/0282645 A1 | 9/2016 | Wang et al. |
| 2016/0357082 A1 | 12/2016 | Kubo et al. |
| 2017/0298682 A1 | 10/2017 | Wang et al. |
| 2017/0299932 A1 | 10/2017 | Wang et al. |

FOREIGN PATENT DOCUMENTS

| | | |
|---|---|---|
| CN | 107438793 A | 12/2017 |
| CN | 107709003 A | 2/2018 |
| CN | 108463912 A | 8/2018 |
| JP | H11316395 A | 11/1999 |
| JP | 2000231125 A | 8/2000 |
| JP | 2001033830 A | 2/2001 |
| JP | 2011095406 A | 5/2011 |
| WO | 2010/032068 A1 | 3/2010 |
| WO | 2014/134714 A2 | 9/2014 |

OTHER PUBLICATIONS

Search Report for European Application No. 19206363.4 mailed on Feb. 20, 2020, 9 pages.
Office Action for European Application No. 19206363.4 mailed on Apr. 30, 2021, 5 pages.
First Search for Chinese Application No. 201911095986.4 mailed on Jul. 15, 2022.
Supplemental Search Report for Chinese Application No. 201911095986.4 mailed on Feb. 2, 2023.
Extended European Search Report for European Patent Application No. 23164353.7 mailed on Jun. 9, 2023.
Non-Final Office Action for U.S. Appl. No. 18/326,866 mailed on Dec. 20, 2023.
First Office Action for Chinese Application No. 202310481813.6 mailed on Dec. 31, 2024.
Communication under Rule 71(3) EPC for European Application No. 23164353.7 mailed on Jan. 15, 2025.
Notification on Registration for Chinese Application No. 202310481813.6 maield on Jul. 16, 2025.
Search Report for European Patent Application No. 25165105.5 mailed on Jul. 24, 2025.
Communication under Rule 71(3) EPC for European Application No. 23 164 353.7 mailed on May 20, 2025.

ELECTROCHROMIC FILMS WITH EDGE PROTECTION

CROSS-REFERENCE OF RELATED APPLICATION(S)

This application is a continuation of U.S. patent application Ser. No. 18/152,033 filed on Jan. 9, 2023, which is a continuation of U.S. patent application Ser. No. 16/190,723 filed on Nov. 14, 2018, now issued as U.S. Pat. No. 11,571,878, and titled "ELECTROCHROMIC FILMS WITH EDGE PROTECTION". The entire content of the above-identified applications are incorporated herein by reference.

FIELD OF THE INVENTION

The invention generally relates to electrochromic devices, and in particular, to electrochromic devices with edge protection and methods for making the same.

BACKGROUND

Electrochromism generally refers to a reversible change in optical properties of a material upon application of a potential. In particular, electrochromic materials exhibit a reversible color change due to an electrochemical reduction-oxidation (redox) reaction caused by application of an electric field.

Electrochromic materials are useful for a variety of applications, including photovoltaic devices, field effect transistors, organic light emitting diodes, general printed electronics, anti-glare windows, display systems, etc.

Usually, electrochromic materials are sandwiched between rigid substrates to make devices. The electrochromic films based on flexible substrates have advantages over the traditional electrochromic glasses in terms of weight, case of transportation, ability to apply on curved surface, etc.

For applications involving smart window technology, the electrochromic materials need to be integrated with a glass substrate (e.g., a glass window) to be serviceable. The integration process usually requires that the electrochromic film be sandwiched between two glass panels with interlayers such as polyvinyl butyral (PVB) and SentryGlas etc. Then, those packages would be pressed and heated at certain pressure and temperature. After the lamination process, the interlayers will be cured and will fix the electrochromic film between glass panels. There are certain additives within the interlayers for the purpose of chemical and physical property modifications. Those additives can infiltrate into the multi-layer electrochromic films and adversely affect the electrochromic films. As a result, the performance and lifetime of electrochromic films can be severely compromised.

Therefore, there is a need for an improved design of electrochromic films to address the above and other problems.

SUMMARY

The present disclosure provides a method of preparing an electrochromic film having edge protection to protect the edges of the electrochromic film from being infiltrated by undesired materials as well as oxygen and moisture. An electrochromic film may include a first electrode, a second electrode, an electrochromic material deposited on at least the first electrode, a charge storage layer deposited on the second electrode, and a solid polymer electrolyte disposed between the electrochromic material and the charge storage layer.

An electrochromic film generally may be interposed between two interlayers and laminated between two glass panels. In some embodiments, the edges of electrochromic film and the interlayers are covered by an edge protection material protecting the electrochromic film from being exposed to undesired materials from the interlayers and from the ambient environment. Those undesired materials include certain additives inside the interlayers and oxygen and moisture from the ambient environment, which may adversely affect the performance and lifetime of the electrochromic film.

According to one embodiment of the present disclosure, a method for preparing an electrochromic device includes placing an edge protection material on a first and second substrates, placing a first and second interlayers respectively within the edge protection material on the first and second substrates, wherein the edge protection material surrounds edges of the first and second interlayers, interposing an electrochromic film between the first and second interlayers, wherein the edge protection material prevents chemicals in the first and second interlayers from entering into the electrochromic film. The method may also include pressing the first and second substrates toward each other and heating the first and second interlayers to fix the electrochromic film between the first and second substrates.

According to another embodiment of the present disclosure, an electrochromic film includes a first electrode, a second electrode, an electrochromic material deposited on at least the first electrode, a charge storage layer deposited on the second electrode, and a solid polymer electrolyte disposed between the electrochromic material and the charge storage layer. In this embodiment, at least edges of the electrochromic material are covered by an edge protection material.

According to yet another embodiment of the present disclosure, an electrochromic device includes a first glass panel, a first interlayer on the first glass panel, a second glass panel, a second interlayer on the second glass panel, and an electrochromic film between the first interlayer and the second interlayer. The electrochromic film may include a first electrode, a second electrode, an electrochromic material deposited on at least the first electrode, a charge storage layer deposited on the second electrode, and a solid polymer electrolyte disposed between the electrochromic material and the charge storage layer. At least edges of the electrochromic material are covered by an edge protection material.

BRIEF DESCRIPTION OF THE DRAWINGS

Preferred and non-limiting embodiments of the invention may be more readily understood by referring to the accompanying drawings in which.

DETAILED DESCRIPTION OF THE PREFERRED EMBODIMENTS

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise.

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

Figure 1:
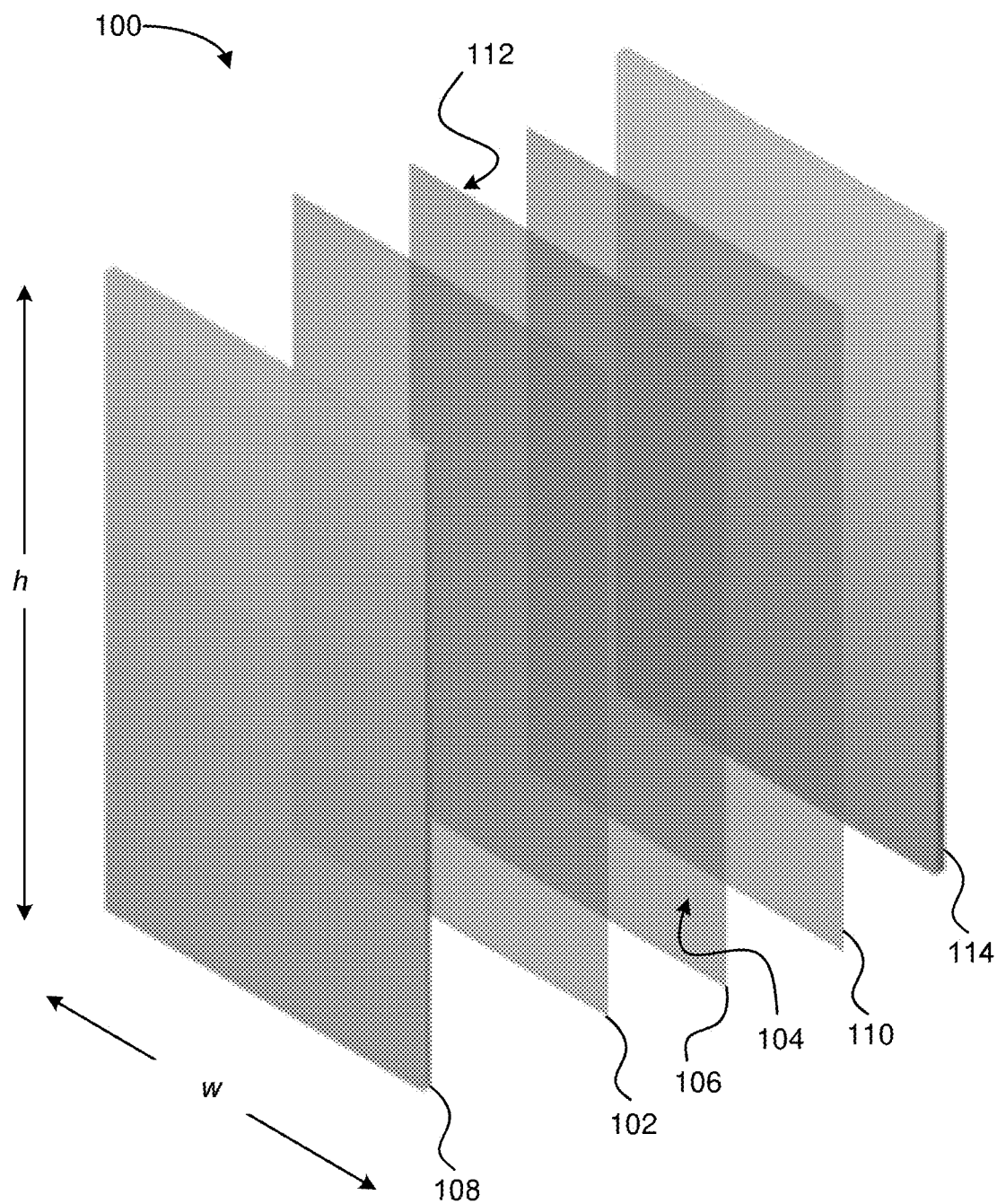
FIG. 1 is a simplified schematic of a laminated structure having an electrochromic film disposed therein, according to one exemplary embodiment.

A simplified schematic of a laminated structure with an electrochromic film interposed therein is shown in FIG. 1, according to one exemplary embodiment. For clarity purposes only, the various components of the laminated structure (e.g., substrates, adhesive layers, and electrochromic film) are shown spaced apart.

As shown in FIG. 1, the laminated structure 100 includes a first adhesive interlayer 102 interposed between a first surface 104 of an electrochromic film 106 and a first substrate 108. The laminated structure 100 also includes a second adhesive interlayer 110 interposed between a second surface 112 of the electrochromic film 106 and a second substrate 114. As seen in the embodiment of FIG. 1, the first and second surfaces 104, 112 correspond to opposing surfaces of the electrochromic film 106.

The first and/or second adhesive interlayers 102, 110 may include a material (e.g., a thermosetting polymer material) configured to securely bond (e.g., cross-link) the electrochromic film 106 with the first and second substrates 108, 114. As such, the first and/or second adhesive interlayers 102, 110 are configured to keep the laminated structure 100 together even when shattered/broken, and prevent the laminated structure 100 from breaking up into large, sharp pieces.

Figure 2:
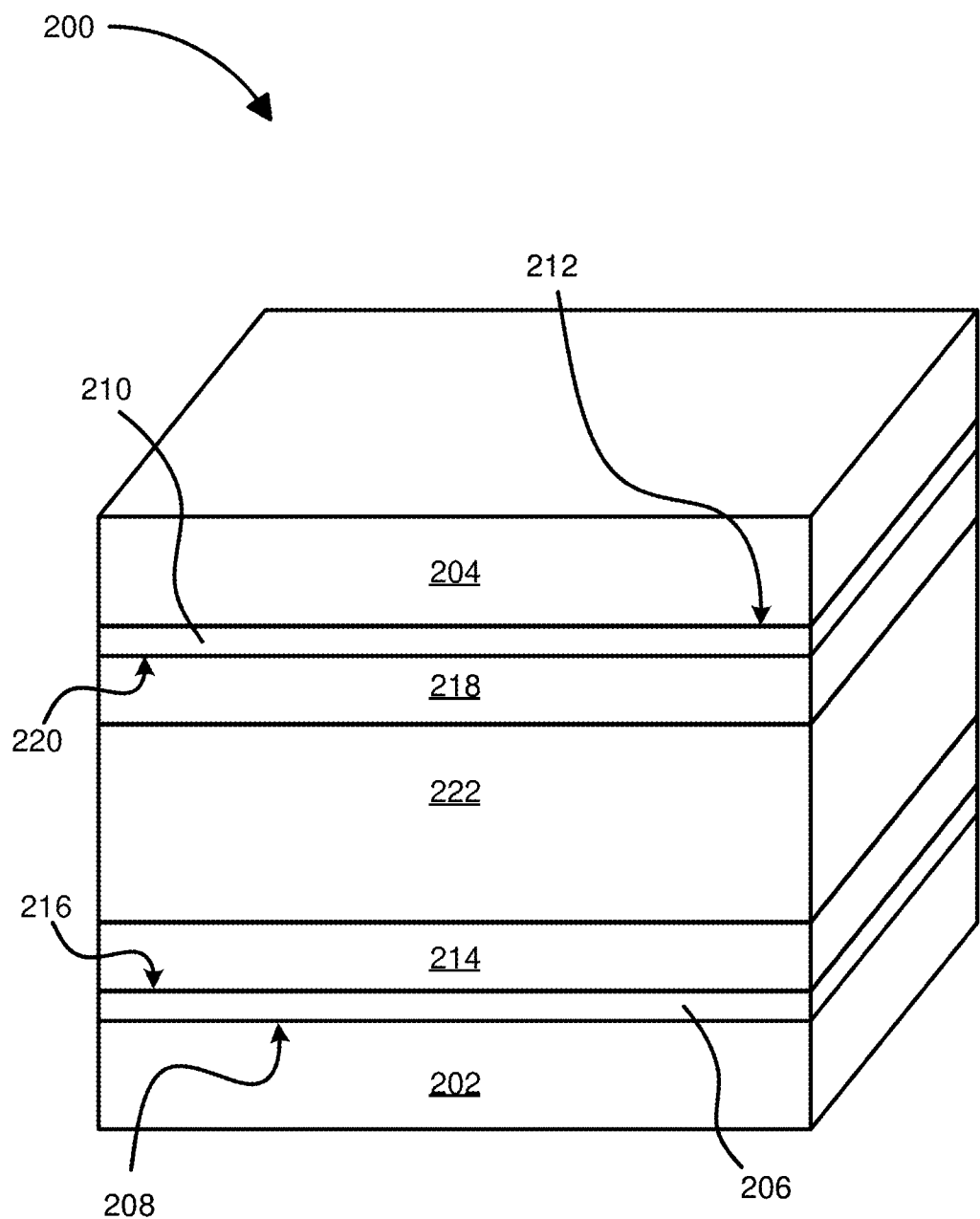
FIG. 2 is a simplified schematic of an electrochromic film, according to one exemplary embodiment.

An exemplary, non-limiting schematic of an electrochromic film 200 is shown in FIG. 2, according to one embodiment. It is important to note that the electrochromic film 200 of FIG. 2 may be implemented in combination with other devices/features/components described herein, such as those described with reference to other embodiments/aspects. The electrochromic film 200 may be used in various applications and/or in permutations, which may or may not be noted in the illustrative embodiments/aspects described herein. For instance, the electrochromic film 200 may include more or less features/components than those shown in FIG. 2, in some embodiments. Additionally, unless otherwise specified, one or more components of the electrochromic film 200 may be of conventional material, design, and/or fabricated using known techniques (e.g., sputtering, chemical vapor deposition (CVD), physical vapor deposition (PVD), plasma-enhanced chemical vapor deposition (PECVD), spray coating, slot-die coating, dip coating, spin coating, printing, etc.), as would be appreciated by skilled artisans upon reading the present disclosure.

As shown in FIG. 2, the electrochromic film 200 includes a first transparent substrate 202 and a second transparent substrate 204 in spaced, parallel relation with each other. The first and second substrates 202, 204 may have the same or different dimensions, comprise the same or different materials, etc. Suitable materials for the first substrate 202 and/or the second substrate 204 may include, but are not limited to, glass, polymeric materials, plastic materials, and/or other materials which are transparent in at least part of the visible region of the electromagnetic spectrum. In some embodiments, the first and second substrates 202, 204 may comprise glass.

As also shown in FIG. 2, a first transparent electrically conductive film 206 is deposited on the interior surface 208 of the first substrate 202 to act as an electrode. A second transparent electrically conductive film 210 is also deposited on the interior surface 212 of the second substrate 204 to act as an electrode. The first and second electrically conductive films 206, 210 may have the same or different dimensions, comprise the same or different material, etc. The first and second electrically conductive films 206, 210 may also each independently have a single layer or multilayer structure. Suitable materials for the first and second electrically conductive films 206, 210 may include, but are not limited to, tin doped indium oxide (ITO), fluorine doped indium oxide, antimony doped indium oxide, zinc doped indium oxide, aluminum doped zinc oxide, silver nanowires, metal mesh, combinations thereof, and/or other such transparent material exhibiting sufficient electrical conductance. In preferred aspects, the first and second electrically conductive films 206, 210 may each include an electrode layer including tin doped indium oxide (ITO).

The electrochromic device 200 may additionally include an electrical power supply (not shown) configured to supply voltage between the first and second electrically conductive films 206, 210.

As further shown in FIG. 2, a layer 214 of electrochromic material is deposited on the interior surface 216 of the first electrically conductive film 206. The layer 214 of electrochromic material is configured to cause a reversible color change upon reduction (gain of electrons) or oxidation (loss of electron) introduced by an applied electrical current. In some embodiments, the layer 214 of electrochromic material may be configured to change from a transparent state to a colored state, or from a colored state to another colored state, upon oxidation or reduction. In some embodiments, the layer 214 of electrochromic material may be a polyelectrochromic material in which more than two redox states are possible, and may thus exhibit several colors.

In some embodiments, the layer 214 of electrochromic material may comprise an organic electrochromic material, an inorganic electrochromic material, a mixture of both, etc. The layer 214 of electrochromic material may also be a reduction colored material (i.e., a material that becomes colored upon acquisition of electrons), or an oxidation colored material (i.e., a material that becomes colored upon the loss of electrons).

In some embodiments, the layer 214 of electrochromic material may include a metal oxide such as $MoO_3$, $V_2O_5$, $Nb_2O_5$, $WO_3$, $TiO_2$, $Ir(OH)_x$, $SrTiO_3$, $ZrO_2$, $La_2O_3$, $CaTiO_3$, sodium titanate, potassium niobate, combinations thereof, etc. In some embodiments, the layer 214 of electrochromic material may include a conductive polymer such as poly-3,4-ethylenedioxy thiophene (PEDOT), poly-2,2'-bithiophene, polypyrrole, polyaniline (PANI), polythiopene, polyisothianaphthene, poly(o-aminophenol), polypyridine, polyindole, polycarbazole, polyquinone, octacyanophthalocyanine, combinations thereof, etc. Moreover, in some embodiments, the layer 214 of electrochromic material may include materials, such as viologen, anthraquinone, phenocyazine, combinations thereof, etc. Additional examples of electrochromic materials, particularly those including multicolored electrochromic polymers, may be found in U.S. patent application Ser. No. 15/399,839, filed Jan. 6, 2017, the entirety of which is herein incorporated by reference.

As additionally shown in FIG. 2, a charge storage layer 218 is deposited on the interior surface 220 of the second electrically conductive film 210. Suitable materials for the charge storage layer 218 may include, but are not limited to, vanadium oxide, binary oxides (e.g., CoO, $IrO_2$, MnO, NiO, and $PrO_x$), ternary oxides (e.g., $Ce_xV_yO_z$), etc.

In some embodiments, the charge storage layer 218 may be replaced with an optional second layer of electrochromic material. This optional second layer of electrochromic material may have the same or different dimensions, comprise the same or different composition, etc., as the first layer 214 of electrochromic material.

The electrochromic device 200 also includes an electrolyte layer 222 positioned between the layer 214 of electrochromic material and the charge storage layer 218. In some embodiments, the electrolyte layer 222 may include a liquid electrolyte as known in the art. In some embodiments, the electrolyte layer 222 may include a solid state electrolyte, including but not limited to, $Ta_2O_5$, MgF, $Li_3N$, $LiPO_4$, $LiBO_2$—$Li_2SO_4$, etc. In some embodiments, the electrolyte layer 222 may include a polymer based electrolyte comprising an electrolyte salt (e.g., LiTFSI, $LiPF_6$, $LiBF_4$, $LiClO_4$, $LiCF_3SO_3$, $LiN(CF_3SO_2)_2$, LiSbFg, $LiAsF_6$, $LiN(CF_3CF_2SO_2)_2$, $(C_2H_5)_4NBF_4$, $(C_2H_5)_3CH_3NBF_4$, LiI, etc.), a polymer matrix (e.g., polyethylene oxide, poly(vinylidene fluoride(PVDF), poly(methyl methacrylate) (PMMA), polyethylene oxide (PEO), poly(acrylonitrile) (PAN), polyvinyl nitrile, etc.), and one or more optional plasticizers (e.g., glutaronitrile, succinonitrile, adiponitrile, fumaronitrile, etc.). Additional examples of electrolyte materials, particularly those including solid polymer electrolytes, may be found in U.S. patent applications Ser. No. 15/399,852, filed Jan. 6, 2017 and Ser. No. 15/487,325, filed Apr. 13, 2017, the entirety of which is herein incorporated by reference.

Figure 3:
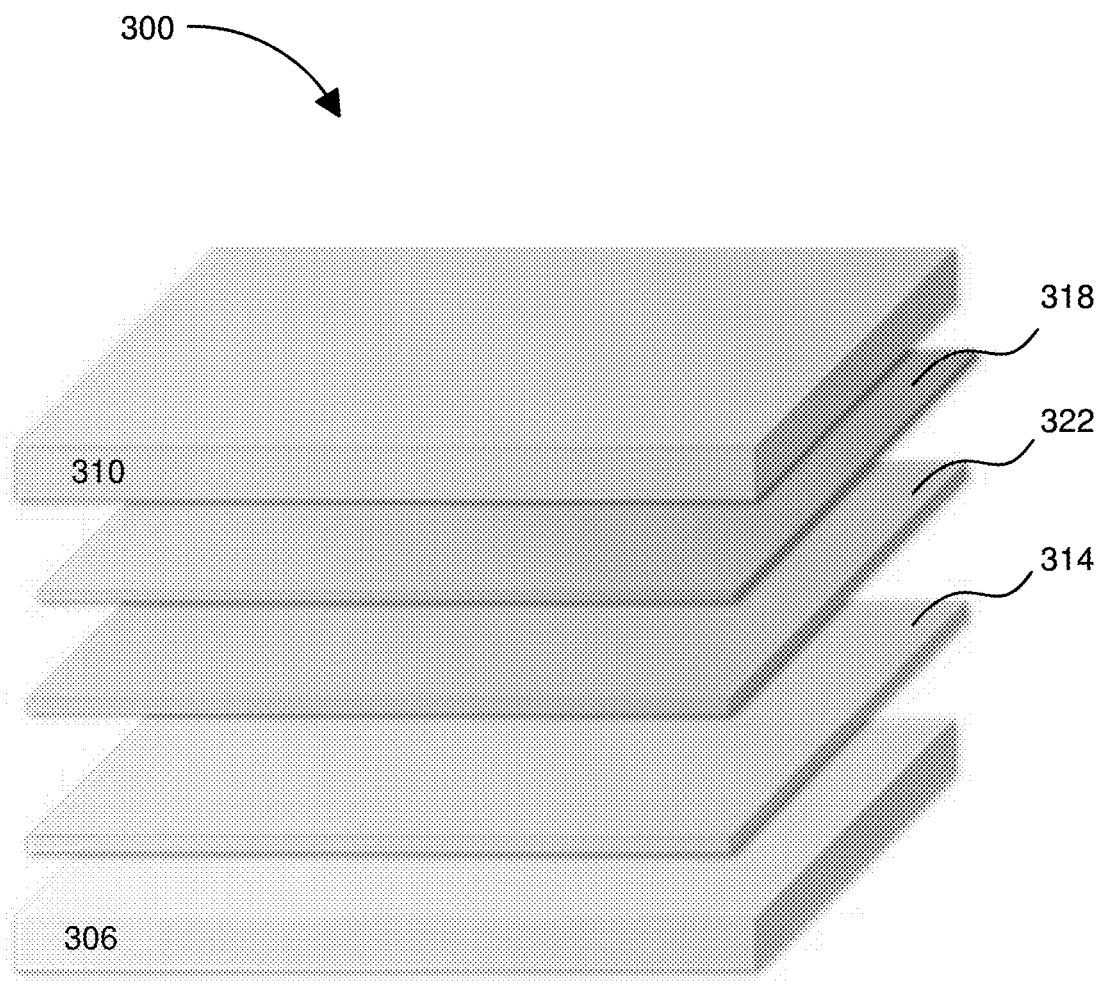
FIG. 3 is a perspective view of an electrochromic film, according to one exemplary embodiment.

FIG. 3 is a perspective view of an electrochromic film 300, according one exemplary embodiment. The difference between FIG. 2 and FIG. 3 is that in FIG. 3 only the electrochromic film 300 is shown in a perspective view, without the first transparent substrate 202 and the second transparent substrate 204 from FIG. 2. Similar to FIG. 2, the electrochromic film 300 includes a first transparent electrically conductive film 306 and a second transparent electrically conductive film 310. Between the first transparent electrically conductive film 306 and the second transparent electrically conductive film 310, the electrochromic film 300 further includes an electrolyte layer 322 positioned between an electrochromic material layer 314 and a charge storage layer 318. In some embodiments, the polymer electrolyte layer 322 is a solid polymer electrolyte and the solid polymer electrolyte includes an electrolyte salt and a polymer matrix as discussed above with respect to the embodiment in FIG. 2.

Figure 4A:
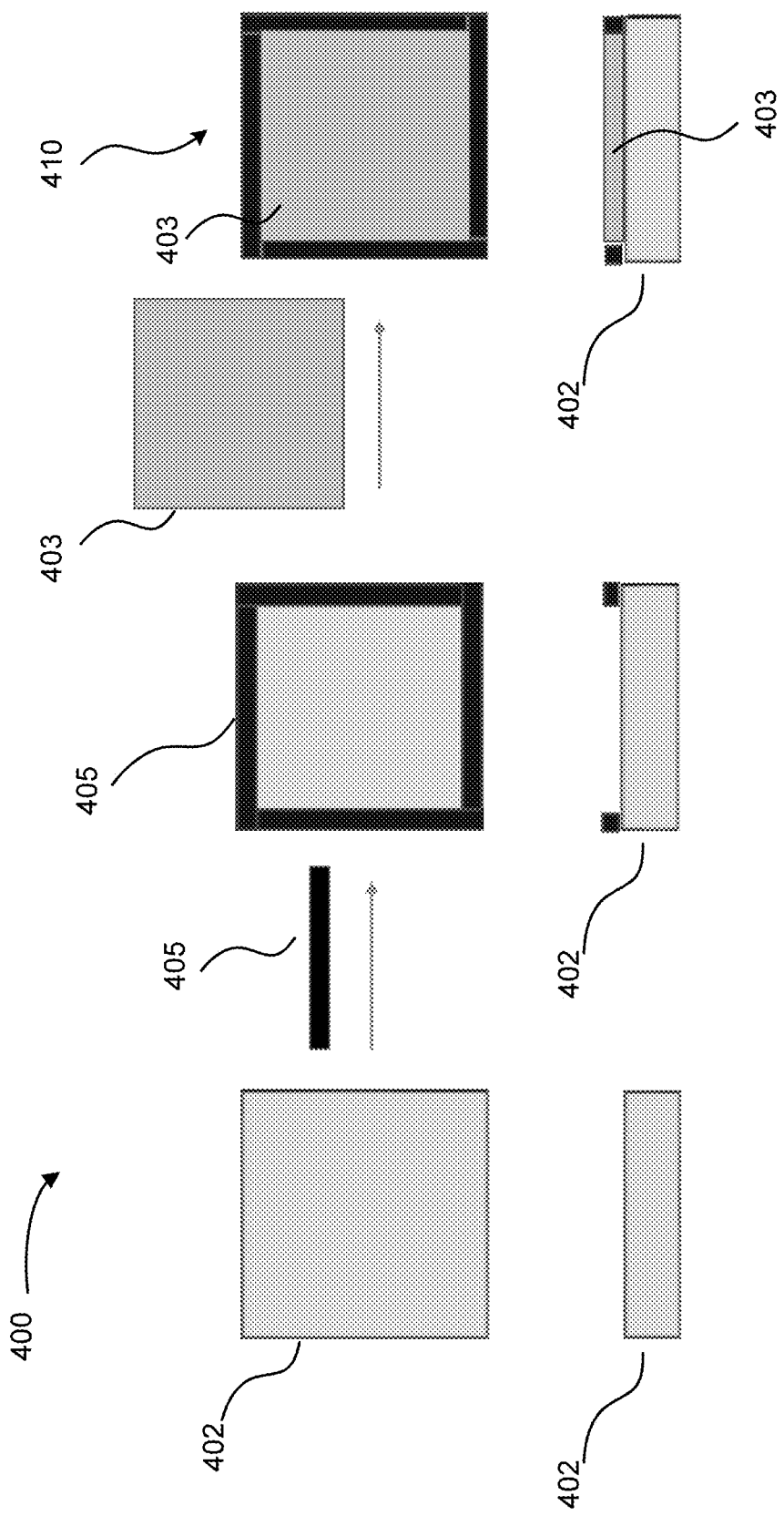
FIGS. 4A-4C illustrate a method of preparing an electrochromic film with edge protection according to an exemplary embodiment.
Figure 4C:
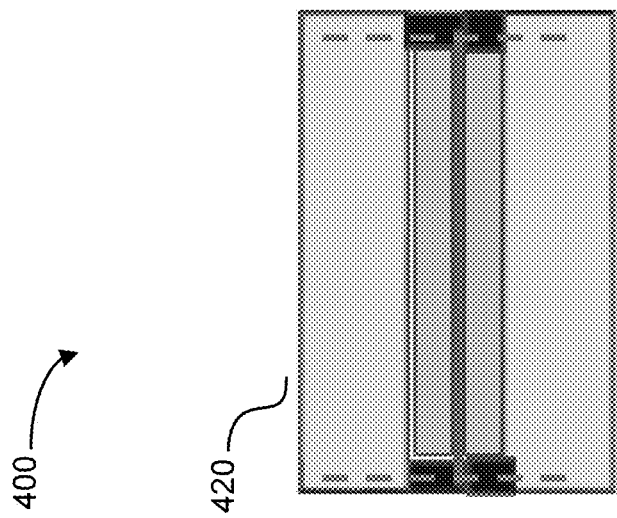
Figure 4B:
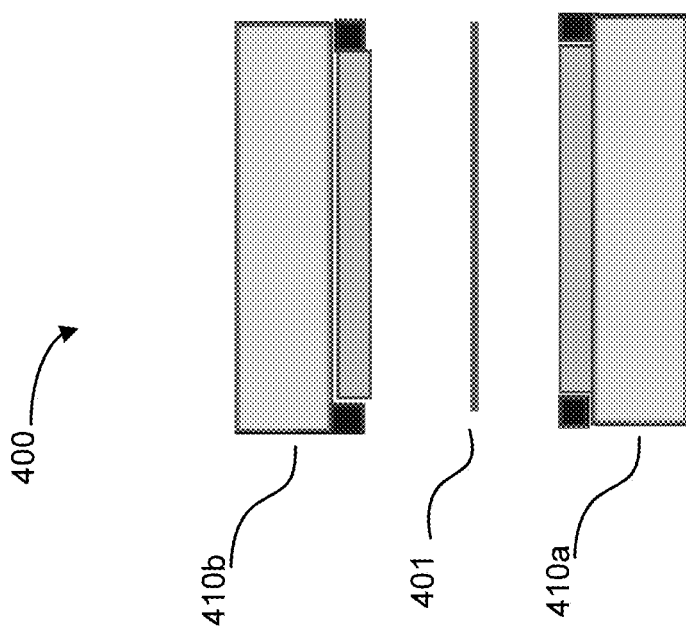

FIGS. 4A-4C illustrate a method 400 of preparing a laminated electrochromic device with edge protection according to one exemplary embodiment. FIG. 4A illustrates a process of making a glass panel with edge protection for laminating with an electrochromic film. In FIG. 4A, a glass panel 402 is first prepared. Then four stripes of edge seal 405 made of an edge protection material are positioned on each of the four edges and on top of the glass panel 402. The edge protection material may be selected from polyvinyl siloxane (PVS), Sentryglas, thermoplastic polyurethane (TPU), ethylene-vinyl acetate (EVA), etc. Next an interlayer 403 is placed on the center of the glass panel 402, within the area confined by the four stripes of edge seal 405 to form a first interlayer-substrate portion 410. The interlayer 403 may be made of polyvinyl butyral (PVB), UV Extraprotect PVB, or the like. As mentioned, the interlayer may contain undesired chemicals that may adversely affect the performance and lifetime of the electrochromic film. Usually, those chemicals may infiltrate the electrochromic film through the joint of the films, often via the electrolyte layer. With the edge protection, the interlayer 403's edges are sealed and the chemicals will not be able to enter into the electrochromic film. The same process can be used to form another interlayer-substrate. As shown in FIG. 4B, two interlayer-substrate portions 410a, 410b are formed, each having an interlayer surrounded by edge protection materials. An electrochromic film 401 is positioned and laminated between the two interlayer-substrate portions 410a, 410b. The electrochromic film 401 can be made as described above with reference to FIGS. 1-3. In FIG. 4C, an electrochromic film 420 with edge protection laminated within two glass panels are shown. The interlayers can be cured by pressing glass panels and heating the electrochromic device.

Figure 5:
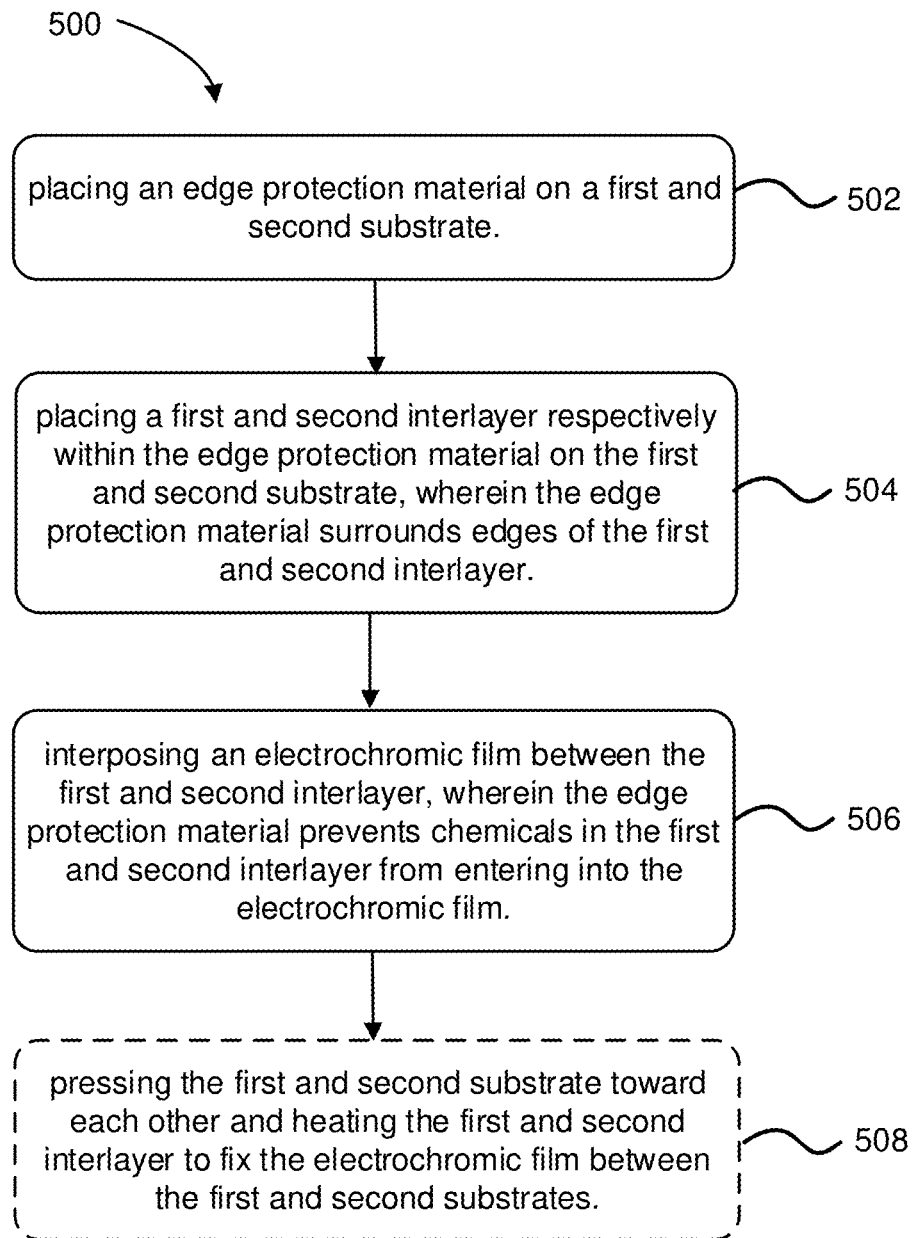
FIG. 5 illustrates a flowchart of a method for preparing an electrochromic device according to an exemplary embodiment.

FIG. 5 illustrates a flowchart 500 summarizing the steps shown in FIGS. 4A-4C. In step 502, an edge protection material is placed on a first and second substrates. In step 504, placing a first and second interlayers respectively within the edge protection material on the first and second substrates, wherein the edge protection material surrounds edges of the first and second interlayers. In step 506, interposing an electrochromic film between the first and second interlayers. The edge protection material may prevent chemicals in the first and second interlayers from entering into the electrochromic film. The method 500 may also include an optional step 508 of pressing the first and second substrates toward each other and heating the first and second interlayers to fix the electrochromic film between the first and second substrates.

Figure 6:
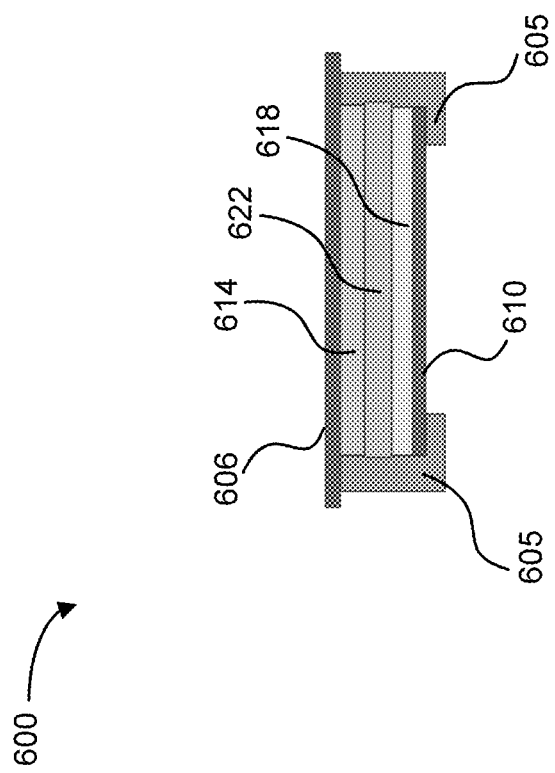
FIG. 6 illustrate an electrochromic film with edge protection according to an exemplary embodiment.

FIG. 6 is a sectional view 600 of the two electrochromic films 606 and 610 where their joint and edges are covered by an edge projection material, e.g., a layer of epoxy 605. In FIG. 6, the two electrochromic films 606 and 610 are sandwiched with an electrochromic material layer 614, an electrolyte layer 622, and a charge storage layer 618. After curing with heat or ultraviolet light, the epoxy 605 can work as an effective oxygen and moisture blocker. Using this method, an electrochromic film roll can be stored in an ambient environment for much longer time without sacrificing performance and lifetime. The epoxy can also be replaced by other suitable materials. In some embodiments, at least edges of one of the first electrode and second electrode, the electrochromic material, the solid polymer electrolyte, and the charge storage layer are covered by the edge protection material.

Figure 7:
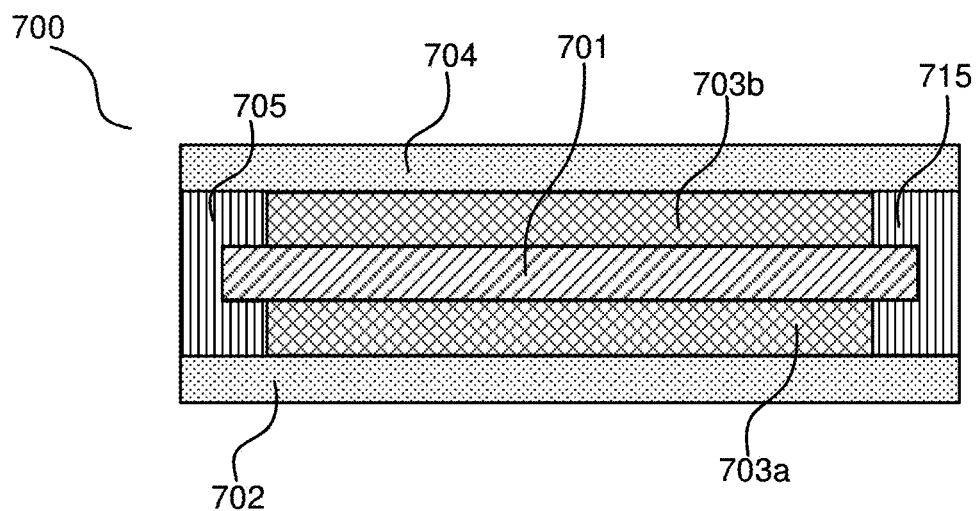
FIG. 7 illustrates a laminated electrochromic film with edge protection according to one exemplary embodiment.

FIG. 7 illustrates a laminated electrochromic device 700 with edge protection according to one exemplary embodiment. The laminated electrochromic device 700 includes a first substrate 702 (e.g., a glass panel) at the bottom, a second substrate 704 (e.g., a glass panel) at the top, a first interlayer 703a positioned above the first substrate 702, a second interlayer 703b positioned below the second substrate 704, an electrochromic film 701, and edge protection materials 705, 715 between the first substrate 702 and the second substrate 704 and around the interlayers 703a and 703b and the electrochromic film 701. The edge protection materials 705, 715 are compatible with the electrochromic film 701 and the substrates but resistant to the chemicals of the interlayers 703a and 703b. The electrochromic film 701 is prepositioned so that its edges fit the edge protection materials 705, 715. Followed by normal laminating process such as autoclave, the electrochromic film 701's edges will be protected by the edge protection materials 705, 715.

Figure 8:
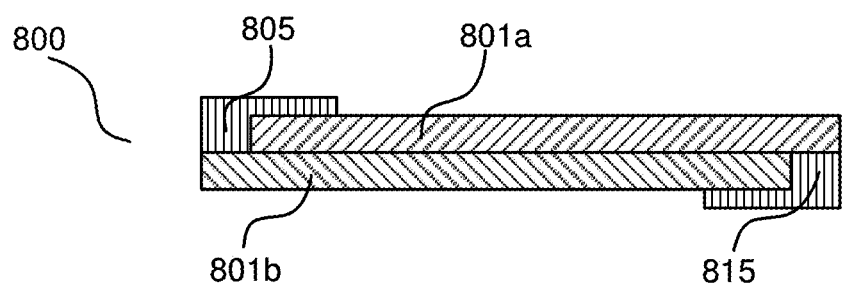
FIG. 8 illustrates an unlaminated electrochromic film with edge protection according to another exemplary embodiment.

FIG. 8 illustrates an electrochromic film 800 with edge protection according to another exemplary embodiment. The electrochromic film in FIG. 8 includes two sides 801a and 801b, one as an anode and the other as a cathode. The upper side 801a is covered by an edge protection material on the left side and the lower side 801b is covered by an edge protection material on the left side. The electrochromic film 800 with edges covered can be rolled and easily stored in an ambient environment for much longer time without sacrificing performance and lifetime.

Figure 9:
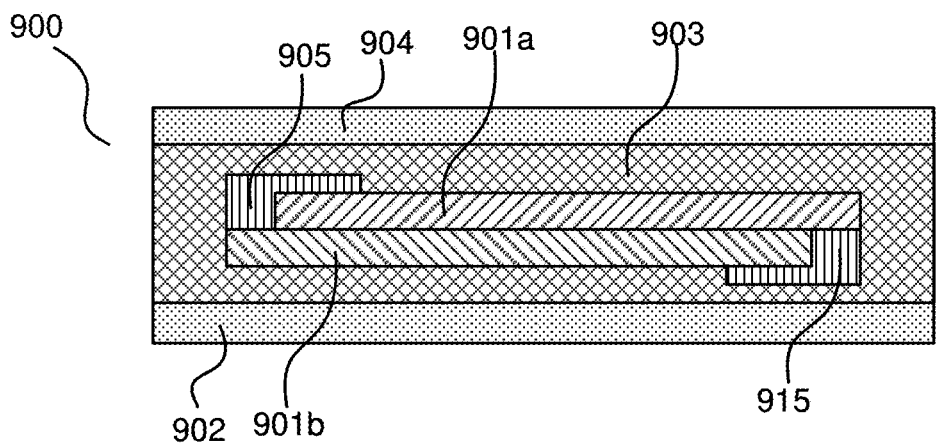
FIG. 9 illustrates another laminated electrochromic film with edge protection according to another exemplary embodiment.

FIG. 9 illustrates another electrochromic device 900 with edge protection according to another exemplary embodiment. Similar to FIG. 8, the electrochromic film in FIG. 9 includes two sides 901a and 901b, one as an anode and the other as a cathode. The edges of the electrochromic film 901a and 901b are covered by an edge protection material, e.g., a layer of epoxy 905 and 915. After curing with heat or ultraviolet light, the epoxy 905 and 915 can work as an effective oxygen and moisture blocker. Then, the electrochromic film can be laminated between two substrates (e.g., glass panels) with a lamination process as described above. Similar to FIG. 7, the laminated electrochromic device 900 includes a first substrate 902 (e.g., a glass panel), a second substrate 904 (e.g., a glass panel), an interlayer 903 between the first substrate 902 and the second substrate 904, and the electrochromic film with edge protection laminated within the interlayer 903.

In some embodiments, the edge protection material, e.g., the epoxy 805/815/905/915, may be electrically conductive so that it can function as the electrodes in the above-described embodiments. By using an electrically conductive material as the edge protection material, the electrochromic film fabrication process can save one step with respect to fabricating the electrodes. Alternatively, the electrically conductive edge protection material can conduct current to the electrode layer and/or charge storage layer.

Figure 10A:
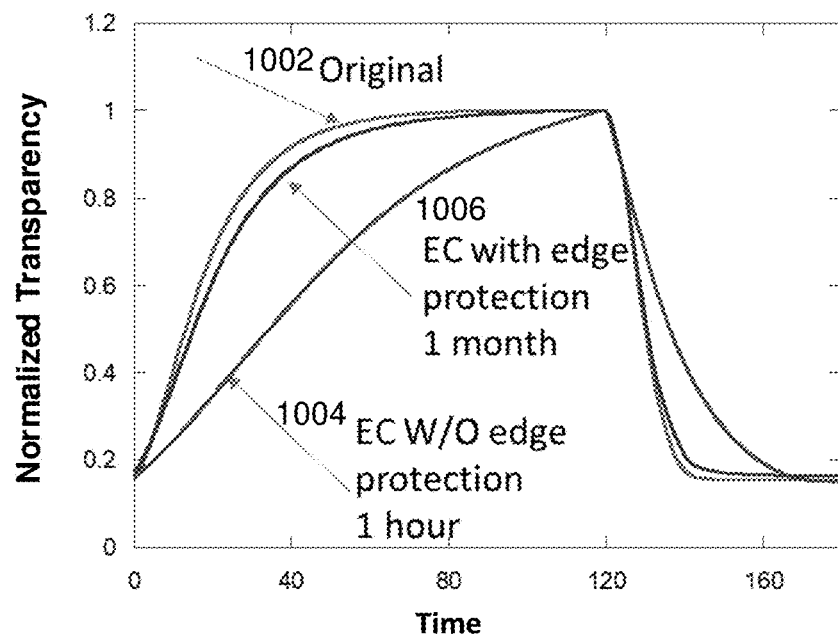
FIG. 10A illustrates performance and lifetime comparison of a laminated electrochromic film with edge protection according to an embodiment and one without edge protection.

FIG. 10A illustrates performance and lifetime comparison of a laminated electrochromic film with edge protection according to an embodiment and one without edge protection. The curve 1002 is the original performance of a laminated electrochromic film, i.e., performance without degradation. It shows a behavior of normalized transparency as a function of time for a laminated electrochromic film with no degradation. The curve 1004 shows a behavior of normalized transparency as a function of time of a laminated electrochromic film without edge protection. The curve 1006 shows a behavior of normalized transparency as a function of time of a laminated electrochromic film with edge protection. With comparison among curves 1002, 1004 and 1006 in FIG, 10A, one can find that the device without edge protection (curve 1004) shows very poor stability. After 1 h speeded degradation at 100° C., the device already slows down in switch response. In contrast, the device with edge protection (curve 1006) only shows limited sign of degradation after 1 month of speeded degradation stress test. Therefore, with an edge protection, a laminated electrochromic film device can be better protected from degradation.

Figure 10B:
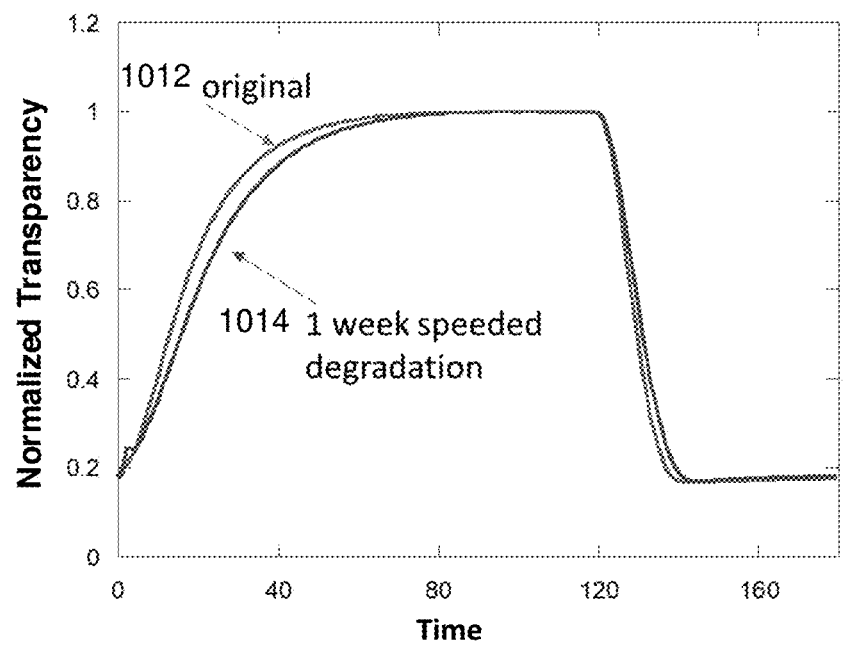
FIG. 10B illustrates performance and lifetime comparison of an unlaminated electrochromic film with edge protection according to an embodiment and one without edge protection.

FIG. 10B illustrates performance and lifetime comparison of an unlaminated electrochromic film with edge protection according to an embodiment and one without edge protection. The curve 1012 is the original performance of an unlaminated electrochromic film, i.e., performance without degradation. It shows a behavior of normalized transparency as a function of time for an unlaminated electrochromic film with no degradation. The curve 1014 shows a behavior of normalized transparency as a function of time of an unlaminated electrochromic film with edge protection. As shown in FIG. 10B, after 1 week of speeded degradation stress, the device with edge protection (curve 1014) still holds a reasonable good switch speed, i.e., similar to the original curve 1012. Therefore, with an edge protection, an unlaminated electrochromic film can be protected from degradation, leaving a long process window for further lamination process.

This specification describes protecting edges of an electrochromic film that is usually fabricated by a roll-to-roll process with low cost. Since the electrochromic films need to be laminated between substrates (e.g., two glass panels) in their actual application, such as smart windows, without using the methods described above, the selection of lamination interlayer materials would be limited and the storage and transportation would require much more dedicated environment and conditions. The embodiments described above are useful in facilitating the application of electrochromic films in the window industry.

The invention described and claimed herein is not to be limited in scope by the specific preferred embodiments disclosed herein, as these embodiments are intended as illustrations of several aspects of the invention. Indeed, various modifications of the invention in addition to those shown and described herein will become apparent to those skilled in the art from the foregoing description. Such modifications are also intended to fall within the scope of the appended claims.

What is claimed is:

1. An electrochromic device comprising:
an electrochromic film comprising a first electrode layer and a second electrode layer facing the first electrode layer of the electrochromic film, wherein:
  an edge of the first electrode layer is cut such that a portion of an inner surface of the second electrode layer is exposed, and
  an edge of the second electrode layer is cut such that a portion of an inner surface of the first electrode layer is exposed, the edge of the first electrode layer and the edge of the second electrode layer are opposing edges;
a first edge protection material sealing the exposed portion of the inner surface of the second electrode layer; and
a second edge protection material sealing the exposed portion of the inner surface of the first electrode layer.

2. The electrochromic device of claim 1, wherein:
the first edge protection material is in an L shape, further sealing a side surface of the first electrode layer and a portion of an external surface of the first electrode layer.

3. The electrochromic device of claim 1, wherein:
the second edge protection material is in an L shape, further sealing a side surface of the second electrode layer and a portion of an external surface of the second electrode layer.

4. The electrochromic device of claim 1, wherein:
the first edge protection material and the second edge protection material comprise epoxy.

5. The electrochromic device of claim 1, wherein
the first edge protection material and the second edge protection material comprise electrically conductive material.

6. The electrochromic device of claim 1, wherein:
the first edge protection material and the second edge protection material are cured with heat or ultraviolet light, functioning as oxygen and moisture blockers.

7. The electrochromic device of claim 1, further comprising:
a first substrate;
a second substrate; and
an interlayer between the first substrate and the second substrate, wherein:
  the first electrode layer, the second electrode layer, the first edge protection material, and the second edge protection material are laminated within the interlayer.

8. The electrochromic device of claim 1, wherein the first electrode layer and the second electrode layer sandwich a layer of electrochromic material, a layer of electrolyte material, and a layer of charge storage material.

9. The electrochromic device of claim 8, wherein the layer of electrochromic material, the layer of electrolyte material, and the layer of charge storage material are cut in a same way as the edge of the first electrode layer to expose the portion of the inner surface of the second electrode layer.

10. The electrochromic device of claim 8, wherein the layer of electrochromic material, the layer of electrolyte material, and the layer of charge storage material are cut in a same way as the edge of the second electrode layer to expose the portion of the inner surface of the first electrode layer.

11. The electrochromic device of claim 1, wherein the first electrode layer comprises a first electrode layer including tin doped indium oxide (ITO).

12. The electrochromic device of claim 1, wherein the second electrode layer comprises a second electrode layer including tin doped indium oxide (ITO).

* * * * *